(No Model.)

H. A. HOUSEL.
CASTER.

No. 494,677. Patented Apr. 4, 1893.

Witnesses

Inventor
Herbert A. Housel
By his Attorneys,

UNITED STATES PATENT OFFICE.

HERBERT A. HOUSEL, OF COLUMBIA CITY, INDIANA.

CASTER.

SPECIFICATION forming part of Letters Patent No. 494,677, dated April 4, 1893.

Application filed January 26, 1892. Serial No. 419,330. (No model.)

*To all whom it may concern:*

Be it known that I, HERBERT A. HOUSEL, a citizen of the United States, residing at Columbia City, in the county of Whitley and State of Indiana, have invented a new and useful Caster, of which the following is a specification.

This invention relates to casters; and it has for its object to provide an improved caster for furniture of all descriptions and adapted for use in connection with any other objects on which such articles are used.

To this end it is the main object of this invention to provide an improved caster which is simple in construction, may be easily and securely attached to the object on which it is used, and one which works or rolls without any material friction, if any at all, and thus avoids the many disadvantages of ordinary casters which catch the carpet and push the same ahead of it, and also provides one which allows the object to be moved quickly in all directions.

With these and many other objects in view which will readily appear as the nature of the invention is better understood, the same consists in the novel construction, combination and arrangement of parts hereinafter more fully described, illustrated and claimed.

Figure 1:
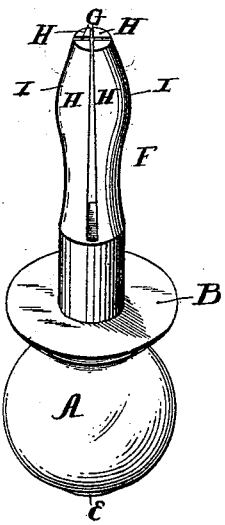
Figure 2:
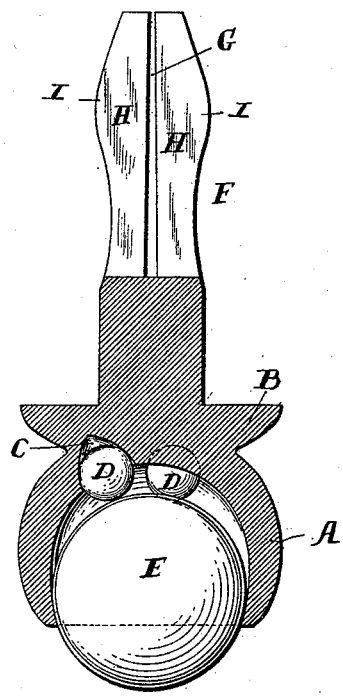
Figure 3:
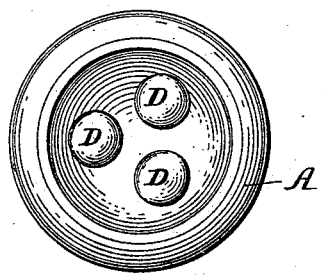

In the accompanying drawings;—Figure 1 is a perspective view of a ball caster constructed in accordance with my invention. Fig. 2 is a longitudinal sectional view of the same. Fig. 3 is a plan view of the caster socket with the ball caster removed.

Referring to the accompanying drawings;— A represents the main body or socket of a caster, directly above which is located the flat shoulder B, upon which the body and weight of the object, to which the caster is attached, rest. The said socket A is spherical in shape, and is provided in the bottom thereof with a series of circular bearing recesses C, which accommodate a number of small anti-friction rollers or balls D which form a ball bearing for the large caster ball E, which is inclosed by and clamped within the spherical ball socket A. The said ball socket A is originally of sufficient width at its open lower end to allow for the insertion of the friction balls D and the main caster ball E, which when placed in position are held in the socket by means of compressing the lower edge of the same. The said socket may also be made in two pieces and having a cap ring as usual in casters of this character, but the main construction of the socket is not essential but may be varied by the manufacturer.

Extending above the shoulder B of the caster is the cylindrical fastening shank F which is designed to be inserted in the opening in the object formed for its reception, and which securely and fixedly holds the caster to said object. The said shank F is provided above the termination of the cylindrical portion with a series of right angularly crossed slits G, forming a multiplicity of separate spring tongues H, which normally spring wider than the bore of the hole formed for its reception, and also of the diameter of the portion of the shank adjacent to the shoulder B, which is not slit. The said shank F at a point near the upper end of the spring tongues thereof is provided with a rounded swell or knob portion I, which, when the said spring tongues are compressed by entering the hole adapted for their reception, is designed to bite the said opening under the expansive tendency of said spring tongues, and thus cause the caster to be firmly held to the object on which it is used without the use of screws or other fastening means.

The construction and many advantages of the herein described caster are thought to be apparent without further description.

Having thus described my invention, what I claim, and desire to secure by Letters Patent, is—

A caster socket having a flat integral resting shoulder, a solid integral fastening shank arising from said shoulder and having a solid cylindrical portion directly above the shoulder, a swell or knob near its outer end above said solid cylindrical portion, a series of longitudinally disposed and right angularly crossed slits extending from the upper end of the shank to the solid cylindrical portion of the shank to form a multiplicity of spring tongues adapted to throw the several portions of the swell or knob against the sides of the opening in which the shank is inserted and hold the same stationary therein, said solid cylindrical portion also snugly entering the opening adapted for the reception of the shank and the caster-ball loosely working in said socket, substantially as set forth.

In testimony that I claim the foregoing as my own I have hereto affixed my signature in the presence of two witnesses.

HERBERT A. HOUSEL.

Witnesses:
GEORGE A. PONTIUS,
GEORGE HILDEBRAND.